(12) United States Patent
Kaneko et al.

(10) Patent No.: US 6,297,915 B1
(45) Date of Patent: Oct. 2, 2001

(54) IMAGE PICKUP LENS

(75) Inventors: Isamu Kaneko; Tomohiro Saito, both of Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/512,737

(22) Filed: Feb. 24, 2000

(30) Foreign Application Priority Data

Feb. 26, 1999 (JP) .................................................. 11-050505

(51) Int. Cl.[7] .............................. G02B 3/02; G02B 3/00
(52) U.S. Cl. ......................................... 359/718; 359/642
(58) Field of Search ................................. 359/642, 718, 359/719, 748

(56) References Cited

U.S. PATENT DOCUMENTS

| | | | | |
|---|---|---|---|---|
| 5,418,649 | * | 5/1995 | Igarashi | 359/716 |
| 5,900,994 | * | 5/1999 | Otomo | 359/773 |
| 5,917,661 | * | 6/1999 | Tochigi | 359/717 |

* cited by examiner

Primary Examiner—Georgia Epps
Assistant Examiner—Gary O'Neill
(74) Attorney, Agent, or Firm—Koda & Androlia

(57) ABSTRACT

In a biconvex lens 1, at least one of faces thereof is formed into an aspherical shape, so that the radius of curvature of the second face of the lens 1 is equal to or larger than 0.65 times the focal length, and the radius of curvature of the first face is over 3 times the radius of curvature of the second face. Thus, the lens can be produced easily at a small size and a light weight.

2 Claims, 5 Drawing Sheets

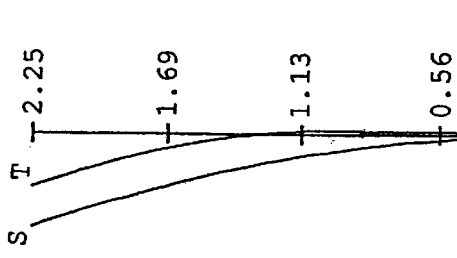
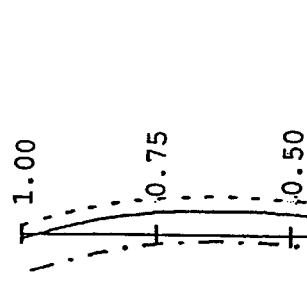
Fig. 3

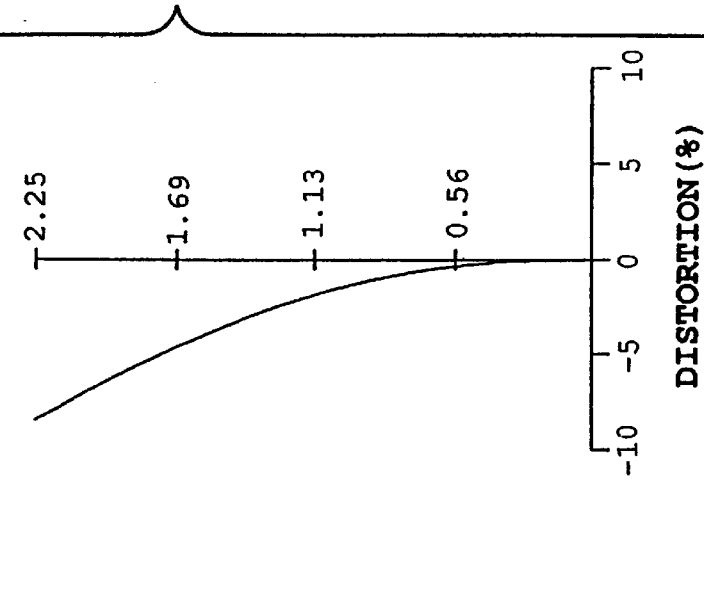
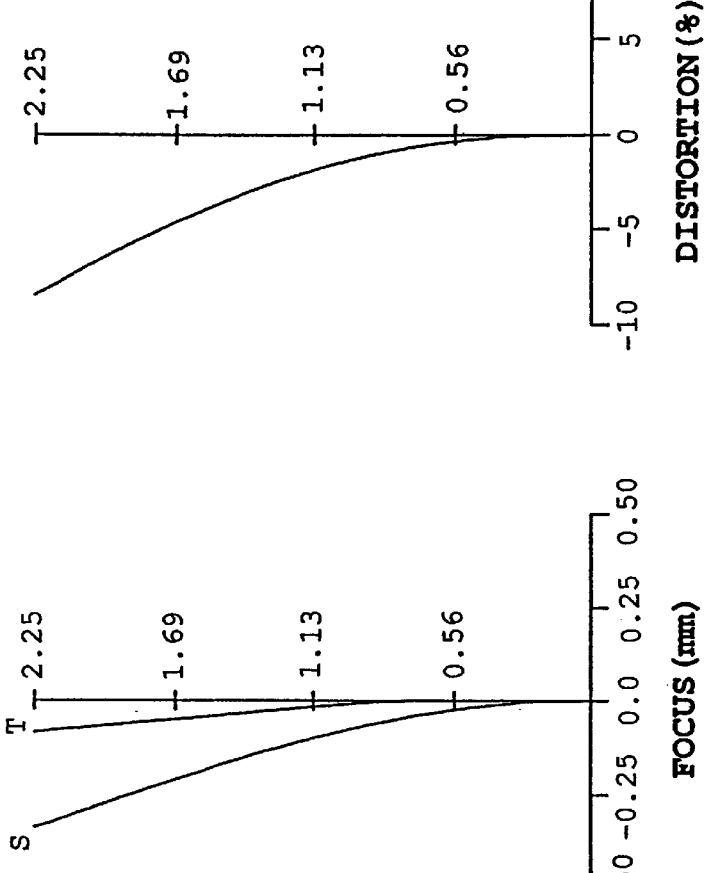
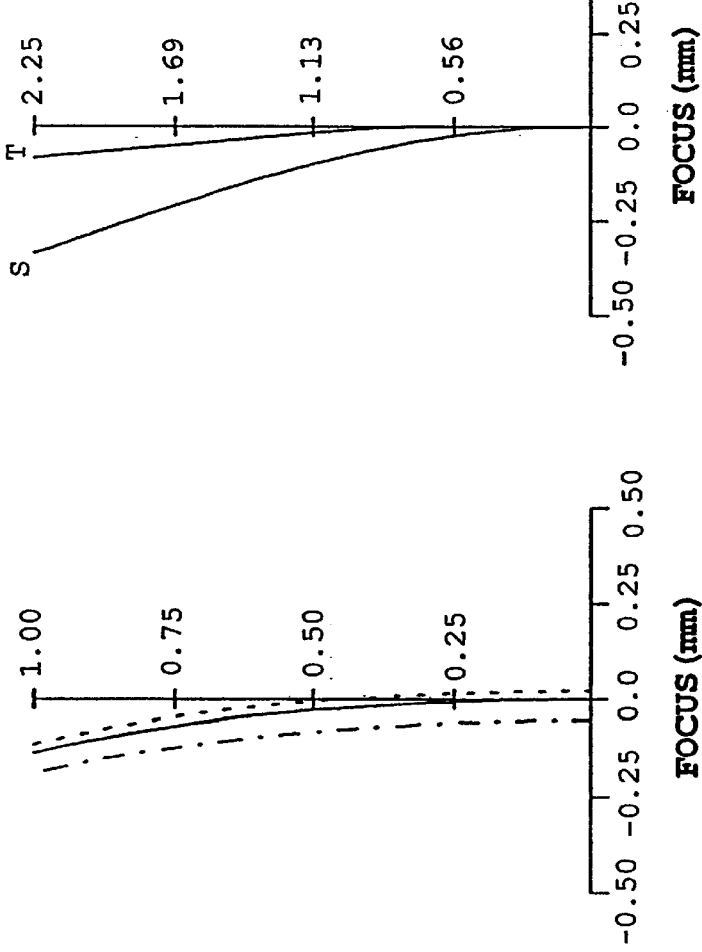
Fig. 5

IMAGE PICKUP LENS

BACKGROUND OF THE INVENTION

1. Field of the Invention

The present invention relates to an image pickup lens and particularly, to a single image pickup lens which is used in an image pick-up device, e.g., a CCD camera, utilizing an image pickup element such as CCD, CMOS and the like mounted on a potable computer, a visual telephone and the like, and which can be reduced in size and weight.

2. Description of the Related Art

In recent years, multimedia have been developed remarkably, and for example, the demand for a CCD camera mounted on a portable computer, a visual telephone and the like is being increased remarkably. Such a CCD camera is required to be mounted in a limited space and for this reason, it is desired that the CCD camera is small in size and lightweight.

Therefore, it is also desired that an image pickup lens used in such a CCD camera is likewise small in size and lightweight.

A so-called single-lens system employing a single lens is conventionally used as such an image pickup lens system.

There is such a conventionally known image pickup lens in a single-lens system, which is disclosed, for example, in Japanese Patent Application Laid-open No.6-88939 and the like.

The known image pickup lens is formed so that the radius of curvature of a second face of the lens is set in a range of 0.5 to 0.63 times the focal length thereof, and the Abbe constant is set smaller than 50.

In the conventional image pickup lens disclosed in Japanese Patent Application Laid-open No. 6-88939, however, in an image pickup element used presently in relatively many fields, an intended effect can be provided, but recently, a further reduction in size of the image pickup element is desired. For example, if the entire optical system is reduced in size in the use of a lens for an image pickup element having a size as small as ⅙ inches or ⅛ inches, the radius of curvature of a second face of the lens is set in a range of 0.5 to 0.63 times the focal length thereof. This results in a problem that the curvature of a second face of the lens is extremely large and hence, it is extremely difficult to process the lens and further, the lens is dim. Moreover, another problem is that the spherical aberration and the coma are increased, because the curvature of the second face of the lens is increased.

SUMMARY OF THE INVENTION

Accordingly, it is an object of the present invention to provide an image pickup lens which can be reduced in size and weight and can be produced easily.

To achieve the above object, according to a first aspect and feature of the present invention, there is provided an image pickup lens which is a biconvex lens, at least one of faces of which is formed into an aspherical shape, so that the following conditions (1) and (2) are satisfied:

(1) $|R_2|/f \leq 0.65$
(2) $|R_1| > 3 |R_2|$ wherein $R_1$ is a radius of curvature of the face of the lens on the side of an object; $R_2$ is a radius of curvature of the face on the side of an image pickup element board; and f is a focal length of the single lens.

With the above arrangement, the lens satisfies the conditions represented by the expressions (1) and (2). Therefore, the aberration can be corrected sufficiently, and a good processability can be provided. Moreover, the radius of curvature of the second face can be prevented from being too increased by limiting it in a relationship with the first face of the lens, thereby ensuring a sufficient back focal length.

As a result, even when a lens for a small-sized image-pickup element is formed, the lens can be produced easily, while maintaining an optical performance such as a required angle of view and the like. In addition, the focal length relative to a required angle of view of an optical system can be decreased and consequently, the reduction in optical performance can be minimized.

According to a second aspect and feature of the present invention, in addition to the first feature, the lens is formed from a resin having a high refractive index.

With the second feature, since the lens is formed from a resin having a high refractive index, the focal length of the lens can be shortened, while maintaining the curvature of the lens.

The above and other objects, features and advantages of the invention will become apparent from the following description of the preferred embodiment taken in conjunction with the accompanying drawings.

BRIEF DESCRIPTION OF THE DRAWINGS

FIG. 3 is graphs showing the spherical aberration, the astigmatism and the distortion of the image pickup lens shown in FIG. 2;

FIG. 5 is graphs showing the spherical aberration, the astigmatism and the distortion of the image pickup lens shown in FIG. 4.

DESCRIPTION OF THE PREFERRED EMBODIMENTS

The present invention will now be described by way of an embodiment with reference to the accompanying drawings.

Figure 1:
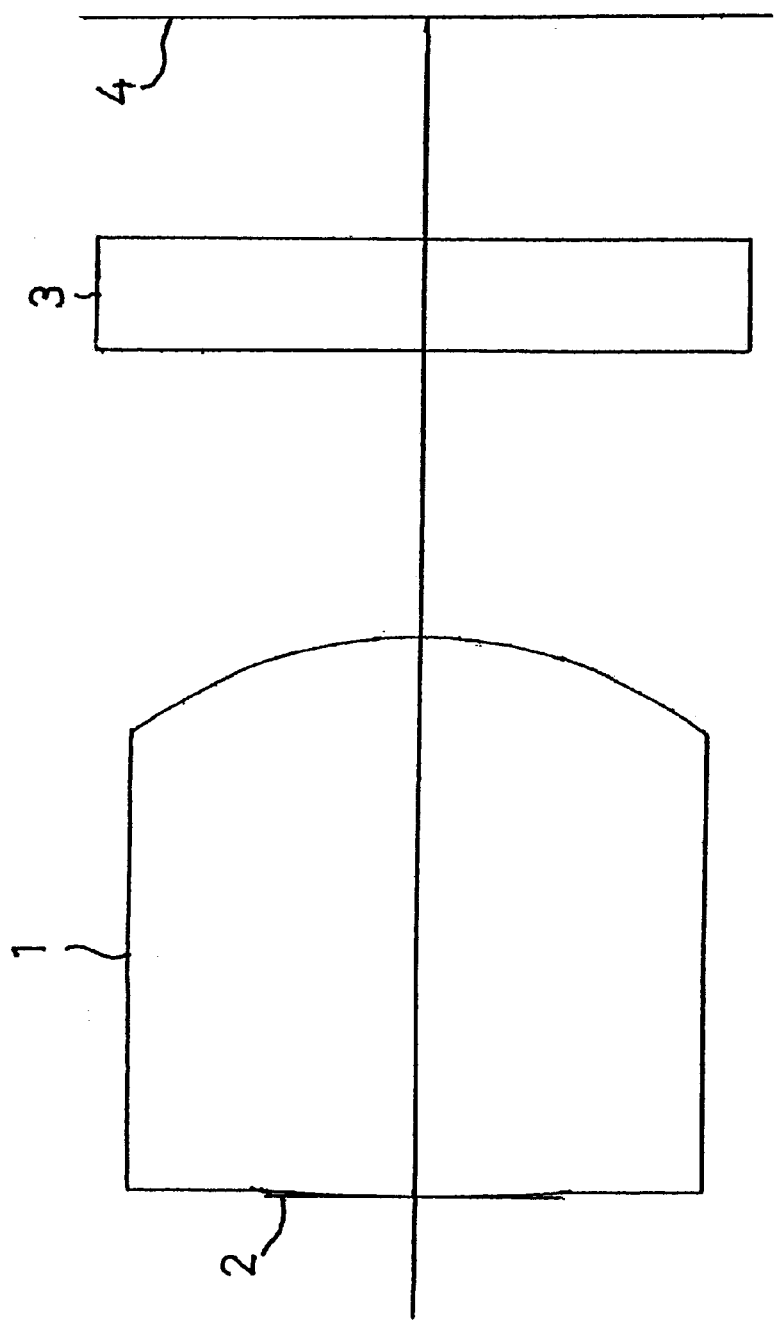
FIG. 1 is an illustration of an arrangement of an embodiment of an image pickup lens according to the present invention.
Figure 2:
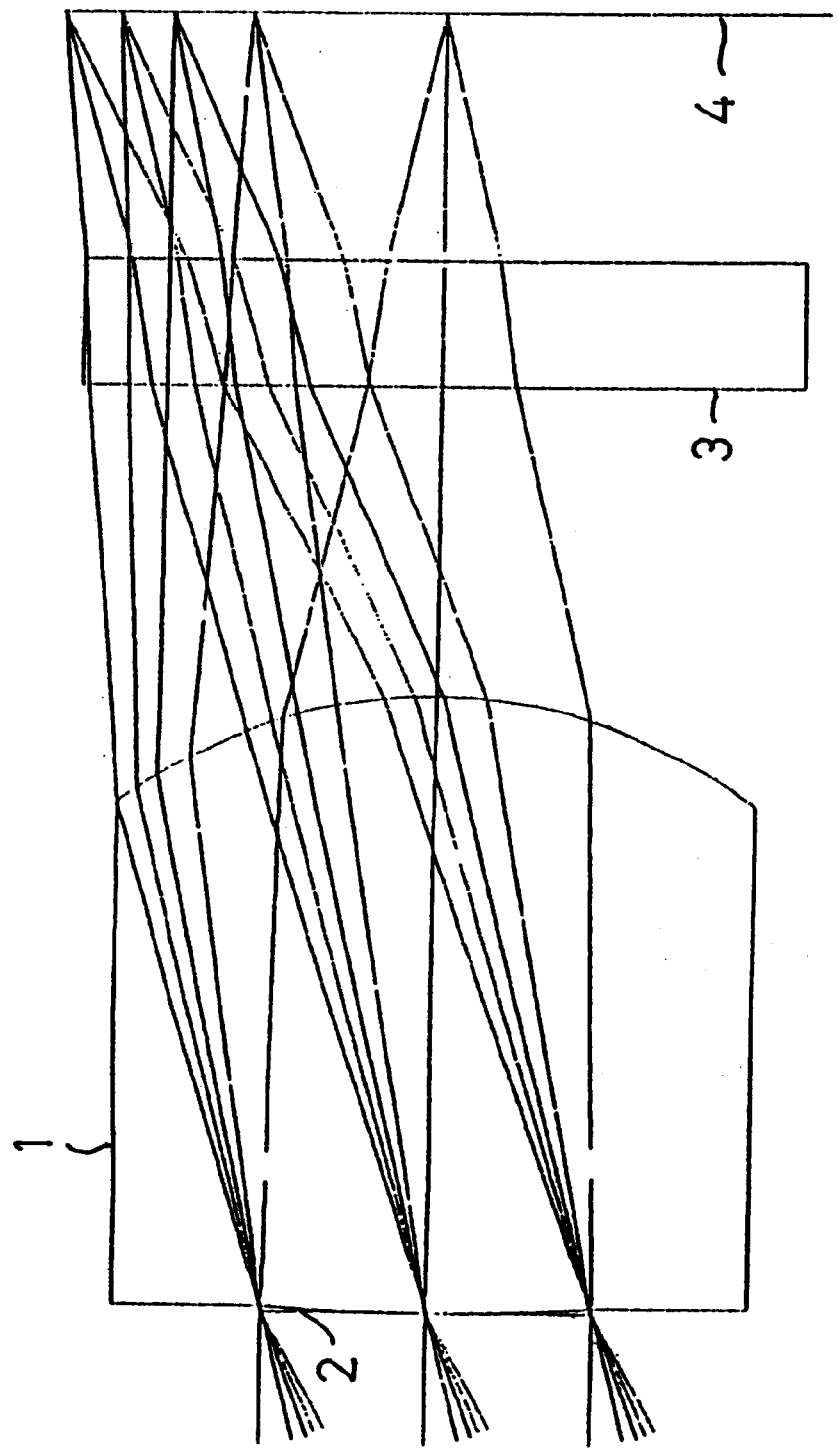
FIG. 2 is an illustration showing a first example of an image pickup lens according to the present invention.
Figure 4:
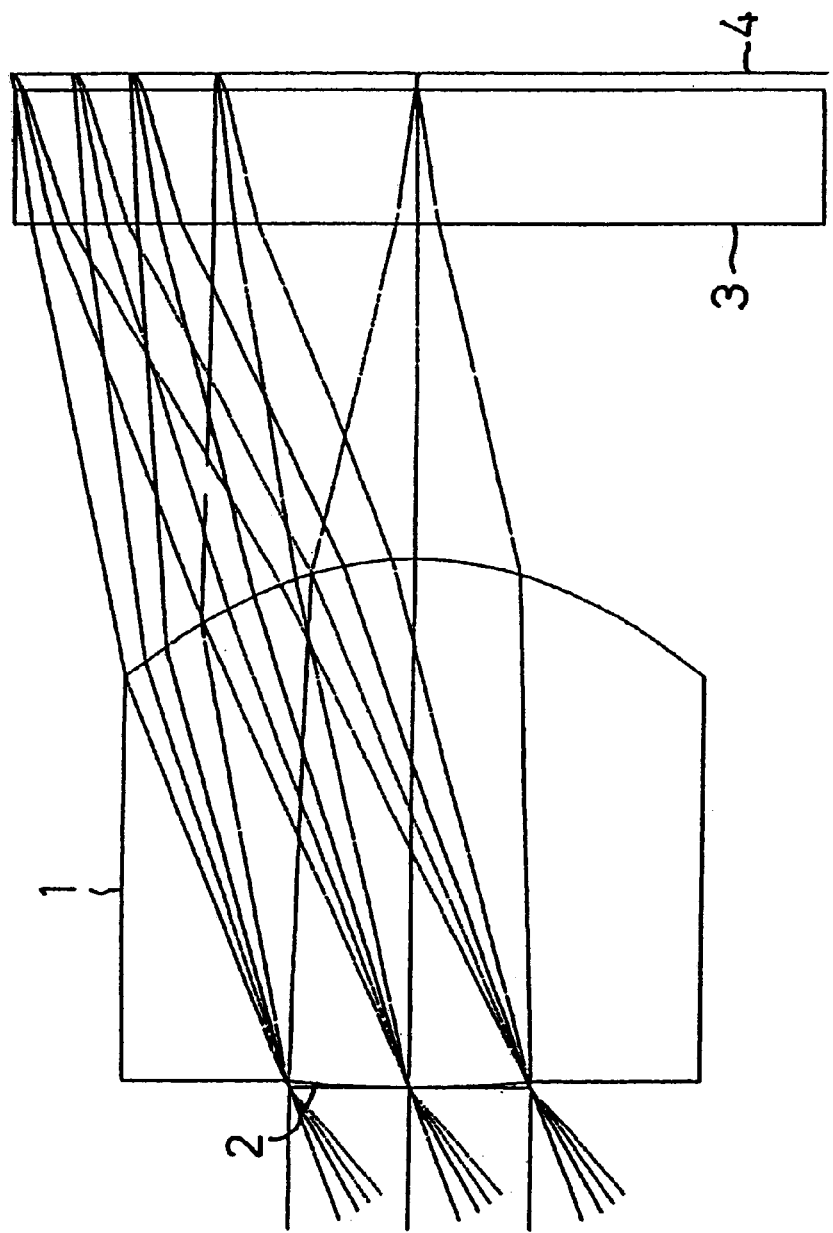
FIG. 4 is an illustration showing a second example of an image pickup lens according to the present invention.

FIG. 1 shows a basic structure of an image pickup lens according to the present invention. Referring to FIG. 1, a biconvex lens 1 is disposed and formed of a resin having a high refractive index such as a polycarbonate-based resin, an acrylic resin, an amorphous polyolefin-based resin and the like.

The lens 1 is formed, so that a first face located on the side of an object has a radius of curvature larger than that of a second face on the opposite side. According to the embodiment of the present invention, the lens 1 satisfies the following conditions:

(1) $|R_2|/f \leq 0.65$
(2) $|R_1| > 3 |R_2|$ wherein $R_1$ is the radius of curvature of the first face of the lens 1; $R_2$ is the radius of curvature of the second face; and f is a focal length.

An diaphragm 2 is disposed on the first face of the lens 1, and a cover glass 3 and a CCD board 4 having a CCD mounted thereon as an image pickup element are disposed sequentially on the side of the second face of the lens 1.

In the embodiment of the present invention, the expressions (1) and (2) represent conditions for sufficiently correcting the aberration and providing a good processability. If $|R_2|/f$ in the first expression is lower than a lower limit, i.e., 0.65, the radius of curvature at the center of the second face of the lens 1 is smaller, it is difficult to process the faces of the lens 1. In addition, the radius of curvature of the second face can be prevented from being too increased by regulating it in the relationship with the first face of the lens 1 according to the expression (2), thereby ensuring a satisfactory back focal length.

In the embodiment of the present invention, even when a lens for a small-sized image pickup radius is formed by setting the radius of the second face of the lens 1 at 0.65 or more by use of a material having a high refractive index, as described above, such lens can be produced easily, while maintaining optical performances such as an angle of view required and the like. If the lens 1 is formed from a resin having a high refractive index, the Abbe constant intends to be decreased and as a result, the chromatic aberration is increased. In the embodiment of the present invention, however, the focal length for a desired angle of view in an optical system can be decreased and as a result, the reduction in optical performance can be minimized.

EXAMPLES

Examples of the present invention will now be described with reference to FIGS. 2 to 5.

In the Examples, f represents a focal length (mm) in each of all systems; F represents an F number; 2ω represents an angle of view; r represents a radius (mm) of curvature of a lens; d represents a lens thickness or an air gap (mm); nd represents a refractive index; and vd represents an Abbe constant.

If a direction of optical axis is taken as an X-axis, while a direction perpendicular to the optical axis is taken as an Y-axis, and a direction of advancement of light is positive, the shape of an aspherical surface of a lens is represented according the following equation:

$$Z = \frac{\frac{x^2}{r}}{1 + \sqrt{1 - (k+1)\frac{x^2}{r^2}}} + ax^4 + bx^6$$

wherein each of k, a and b is an aspherical coefficient.

Example 1 f=4.118, F=2.22, and 2ω=59.0°

| Face | Radius r of curvature | Distance d | Refractive index nd | Abbe constant vd |
|---|---|---|---|---|
| (1) Diaphragm | 0.000 | 0.0000 | | |
| (2) First face of lens | 10.177 | 3.5000 | 1.58370 | 30.7 |
| (3) Second face of lens | −2.748 | 1.8000 | | |
| (4) First face of cover glass | 0.000 | 0.7100 | 1.57200 | 38.0 |
| (5) Second face of cover glass | 0.000 | 1.3.870 | | |
| (6) CCD face | 0.000 | | | |

| | K | Q | B |
|---|---|---|---|
| (2) | −1.724555e+002 | 0.000000e+000 | 0.000000e+000 |
| (3) | −3.062892e+000 | −1.181180e−002 | 4.203907e−004 |

Under such conditions, the following expressions were established:

$|R_2|/f=0.667 \geq 0.65$ $|R_1|/|R_2|=3.703$

In the image pickup lens in Example 1, the spherical aberration, the astigmatism and the distortion are shown in FIG. 3.

It can be seen from the results that any of the spherical aberration, the astigmatism and the distortion was a substantially satisfactory value and hence, sufficient optical characteristics could be provided.

Example 2 f=2.866, F=2.22, and 2ω=83.6°

| Face | Radius r of curvature | Distance d | Refractive index nd | Abbe constant vd |
|---|---|---|---|---|
| (1) Diaphragm | 0.000 | 0.0000 | | |
| (2) First face of lens | 6.572 | 2.8000 | 1.58370 | 30.7 |
| (3) Second face of lens | −1.892 | 1.8000 | | |
| (4) First face of cover glass | 0.000 | 0.7100 | 1.57200 | 38.0 |
| (5) Second face of cover glass | 0.000 | 0.1846 | | |
| (6) CCD face | 0.000 | | | |

| | K | A | B |
|---|---|---|---|
| (2) | −2.238623e+001 | 0.000000e+000 | 0.000000e+000 |
| (3) | −2.369846e+000 | −2.295363e−002 | 2.690089e−003 |

Under such conditions, the following expressions were established:

$|R_2|/f=0.660 \geq 0.65$ $|R_1|/|R_2|=3.474$

In the image pickup lens in Example 2, the spherical aberration, the astigmatism and the distortion are shown in FIG. 5.

It can be also seen from the results that any of the spherical aberration, the astigmatism and the distortion was a substantially satisfactory value and hence, sufficient optical characteristics could be provided.

Although the embodiment of the present invention has been described in detail, it will be understood that the present invention is not limited to the above-described embodiment, and various modifications may be made without departing from the spirit and scope of the invention defined in claims.

What is claimed is:

1. An image pickup lens which is a biconvex lens, at least one of faces of which is formed into an aspherical shape, so that the following conditions (1) and (2) are satisfied:

(1) $|R_2|/f \geq 0.65$ (2) $|R_1| > 3 |R_2|$ wherein $R_1$ is a radius of curvature of the face of the lens on the side of an object; $R_2$ is a radius of curvature of the face on the side of an image pickup element board; and f is a focal length of said single lens.

2. An image pickup lens according to claim 1, wherein said lens is formed from a resin having a refraction index between 1.4 and 1.6 inclusive.

* * * * *